United States Patent
Itoh et al.

(10) Patent No.: US 8,197,949 B2
(45) Date of Patent: Jun. 12, 2012

(54) BLANK FOR A RING MEMBER OF A BEARING, MANUFACTURING METHOD FOR THE SAME, MANUFACTURING METHOD FOR A RING MEMBER OF A BEARING, AND BEARING

(75) Inventors: Hironobu Itoh, Chiba (JP); Hiroaki Matsumura, Chiba (JP); Kenji Takano, Chiba (JP)

(73) Assignee: Seiko Instruments Inc. (JP)

( * ) Notice: Subject to any disclaimer, the term of this patent is extended or adjusted under 35 U.S.C. 154(b) by 325 days.

(21) Appl. No.: 12/311,679

(22) PCT Filed: Jul. 25, 2007

(86) PCT No.: PCT/JP2007/064578
§ 371 (c)(1),
(2), (4) Date: May 26, 2009

(87) PCT Pub. No.: WO2008/041406
PCT Pub. Date: Apr. 10, 2008

(65) Prior Publication Data
US 2009/0257700 A1      Oct. 15, 2009

(30) Foreign Application Priority Data

Oct. 3, 2006 (JP) .................... 2006-271965
Feb. 24, 2007 (JP) .................... 2007-044774

(51) Int. Cl.
*B21K 1/04* (2006.01)
*B21J 1/04* (2006.01)
*F16C 33/64* (2006.01)

(52) U.S. Cl. .................. 428/579; 428/577; 29/898.066; 384/622

(58) Field of Classification Search .................. 428/579
See application file for complete search history.

(56) References Cited

U.S. PATENT DOCUMENTS

| 1,477,570 | A | * | 12/1923 | Lehmann | 29/898.066 |
| 1,971,083 | A | * | 8/1934 | Schlaa | 29/898.066 |
| 3,237,288 | A | * | 3/1966 | Hogan et al. | 29/894.362 |
| 3,968,674 | A | * | 7/1976 | Ishida | 72/334 |
| 4,393,563 | A | * | 7/1983 | Smith | 419/28 |
| 5,406,739 | A | * | 4/1995 | Lu | 43/44.9 |

(Continued)

FOREIGN PATENT DOCUMENTS

JP        55-8338    *  1/1980

(Continued)

OTHER PUBLICATIONS

English machine translation of JP 2002-285297. Oct. 2002.*

(Continued)

*Primary Examiner* — John J Zimmerman
(74) *Attorney, Agent, or Firm* — Adams & Wilks (57) ABSTRACT

Provided is a blank structure for a ring member of a bearing in which a cut target surface after stainless steel is forged has uniform surface characteristics, and highly accurate cutting processing is enabled. A blank (10), which is processed to an outer race (2) and an inner race (3) of a bearing, includes: a cylindrical portion (11, 12) formed by forging a stainless-steel material, and having an inner circumferential surface (11*a*, 12*a*) and an outer circumferential surface (11*b*, 12*b*) entirely being surface eutectic carbides fragmented beds; and a clamp portion (13) provided to one end portion side of the cylindrical portion (11, 12).

21 Claims, 7 Drawing Sheets

U.S. PATENT DOCUMENTS

| | | | | |
|---|---|---|---|---|
| 6,065,322 | A * | 5/2000 | Tabata et al. | 72/334 |
| 6,357,923 | B1 * | 3/2002 | Sato et al. | 384/492 |
| 6,440,233 | B2 * | 8/2002 | Okita et al. | 148/319 |
| 7,396,422 | B2 * | 7/2008 | Miyauchi | 148/334 |
| 7,891,879 | B2 * | 2/2011 | Hirai et al. | 384/544 |
| 2003/0093903 | A1 * | 5/2003 | Obara | 29/898.06 |
| 2003/0154601 | A1 * | 8/2003 | Obara | 29/898.06 |
| 2003/0196468 | A1 * | 10/2003 | Ando et al. | 72/353.2 |
| 2005/0016246 | A1 * | 1/2005 | Yamanaka et al. | 72/355.6 |
| 2009/0208303 | A1 * | 8/2009 | Brunner | 409/231 |
| 2009/0257701 | A1 * | 10/2009 | Maeda et al. | 384/548 |

FOREIGN PATENT DOCUMENTS

| | | | |
|---|---|---|---|
| JP | 59-197335 | * | 11/1984 |
| JP | 7-275990 | * | 10/1995 |
| JP | 2000-167641 | * | 6/2000 |
| JP | 2001-300668 | * | 10/2001 |
| JP | 2002085297 | | 12/2002 |
| JP | 2004358489 | | 12/2004 |
| JP | 2005288505 | | 10/2005 |

OTHER PUBLICATIONS

English machine translation of JP 2004-358489. Dec. 2004.*
English machine translation of JP 2005-288505. Oct. 2005.*
Machine translation of JP 2001-300668. Oct. 2001.*
Patent Abstract of Japan, Publication No. 2000-167641, Publication Date Jun. 20, 2000.

* cited by examiner

BLANK FOR A RING MEMBER OF A BEARING, MANUFACTURING METHOD FOR THE SAME, MANUFACTURING METHOD FOR A RING MEMBER OF A BEARING, AND BEARING

CROSS-REFERENCE TO RELATED APPLICATIONS

This application is a U.S. national stage application of International Application No. PCT/JP2007/064578 filed Jul. 25, 2007, claiming an earliest priority date of Oct. 3, 2006, and published in a non-English language.

BACKGROUND OF THE INVENTION

1. Field of the Invention

The present invention relates to a blank for a ring member of a bearing, which is used in manufacturing a ring member (inner race or outer race) of a bearing provided to a rotational portion of a precision apparatus or the like and a manufacturing method for the same. Also, the present invention relates to a manufacturing method for a ring member of a bearing and a bearing which is manufactured using the manufacturing method.

2. Description of the Related Art

Up to now, there have been increasing strong demands for an entire downsizing and attaining a higher density of a hard disk drive. For this reason, with regard to a ball bearing, too, which is indispensable for the hard disk drive, such as a pivot bearing, there has been demanded a compact and high accuracy product.

Figure 13:
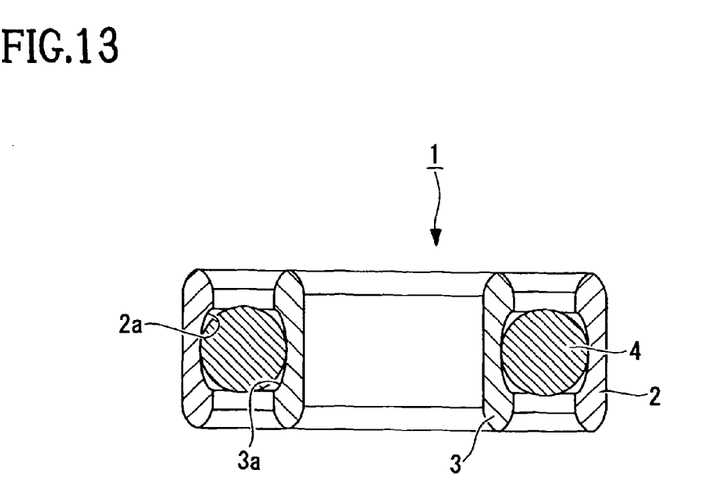
FIG. 13 is a longitudinal cross-sectional view showing a structural example of a bearing.

FIG. 13 is a cross-sectional view showing a structural example of a ball bearing. A ball bearing 1 shown in the figure includes a plurality of balls (spherical bodies) 4 sandwiched between an inner race 3 and an outer race 2. In the following description, the inner race 3 and the outer race 2 are generally called "ring members."

Conventional ring members to be used in precision apparatuses such as a hard disk drive are formed using a columnar blank. First, in order to subject the columnar blank to turning processing, the columnar blank is gripped by a lathe chuck. Then, a solid center portion of the columnar blank is subjected to drill processing by a drill. With regard to the blank now having a substantially-cylindrical shape, which is formed by the drill processing, the cutting processing is performed on an inner circumferential surface and an outer circumferential thereof, to thereby form a desired ring shape. In this case, in the cutting processing of the outer race and the inner race, cutting processing resistance in the drill processing by a drill is much larger compared with that in the cutting processing of the inner circumferential surface and the outer circumferential surface. Therefore, a gripping force of the chuck should be increased conforming with the drill processing.

However, along with downsizing of the bearing, the ring member is made thinner. Accordingly, the cylindrical member is liable to deform by receiving the gripping force of the chuck. For example, in a case where the chuck has a three-claw structure, the cylindrical shape deforms into a triangular shape, whereas in a case where the chuck has a six-claw structure, the cylindrical shape deforms into a hexagonal shape. Those deformations may be observed using a roundness measuring device. For that reason, in a case where the turning processing is performed on the above-mentioned columnar blank to obtain the ring shape, the gripping force of a chuck should be adjusted while paying a careful attention. If the gripping force carelessly increases, roundness of the ring member decreases. Further, if the gripping force of the chuck reduces, the columnar blank detaches in the drill processing generating a large processing resistance, and the production thereof is suspended, causing problems.

Figure 14A:
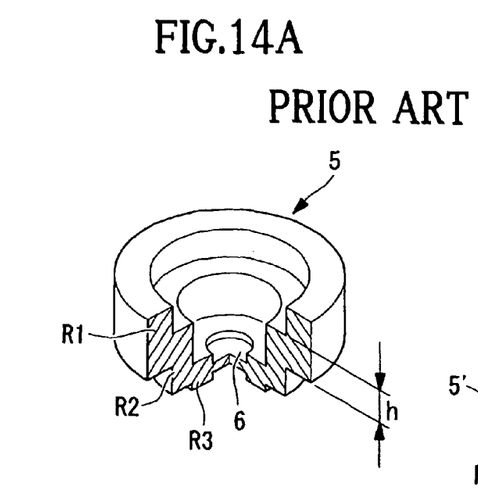
FIG. 14A is a partial cross-sectional perspective view showing a formation material of a bearing preformed by die forging.

Meanwhile, in order to improve yields by reducing materials to be wasted, a technique is disclosed in which, as shown in FIG. 14A, a formation material 5 of a bearing preform is formed by die forging. The formation material 5 is formed such that three cylindrical portions R1, R2, and R3 each having different diameters and being race preforms of the bearings are formed with steps in an axial direction, and a base portion 6 is provided inside the cylindrical portion R3 having the smallest diameter (refer to, for example, JP Patent Publication No. 2000-167641, referred to hereafter as Patent Document 1).

Figure 14B:
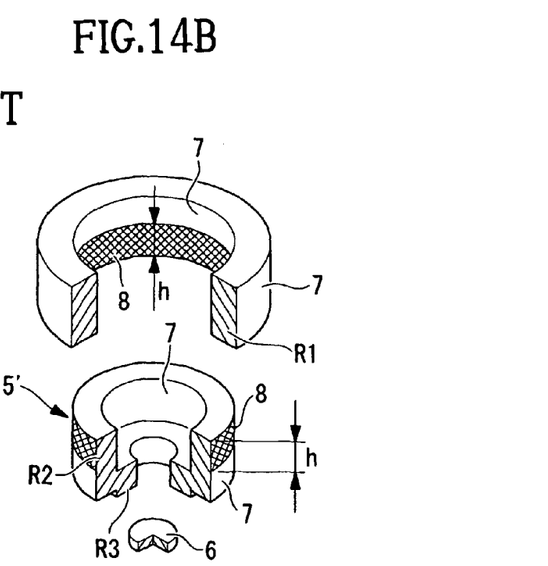
FIG. 14B is a partial cross-sectional perspective view showing a state where a cylindrical portion is separated.

By the way, according to the related art described in Patent Document 1, as shown in FIG. 14B, the formation material 5 formed by die forging is formed such that stepped portions coupling the cylindrical portions each having the different diameters are sequentially punched by a separation punch, and that the cylindrical portions R1, R2, and R3 each having the different diameters are separately and independently formed. For this reason, as a countermeasure for obtaining corrosion resistance or the like required for a bearing of a hard disk device, in a case where stainless steel is used as a material thereof, in an inner circumferential surface of the cylindrical portion R1 separated to be independent from a formation material 5', there exist an upper fluidized bed portion 7 formed by forging, and a lower (having height h) separated layer portion 8 formed by punching. Similarly, in an outer circumferential surface of the formation material 5', there exist the lower fluidized bed portion 7 formed by forging, and the upper (having height h) separated layer portion 8 formed by punching.

It should be noted that an entire outer circumferential surface of the cylindrical portion R1 is formed by die forging, and thus the entire surface becomes the fluidized bed portion 7.

In other words, when the die forging is performed with respect to stainless steel as a material, the surface formed in contact with the die becomes the fluidized bed portion 7, and has, compared to the separated layer portion 8 having the height h separately formed by punching the fluidized bed portion 7, different surface characteristics including higher hardness. This is because, on the surface of the fluidized bed portion 7, a crystal grain size decreases, which is different from that of the separated layer portion 8, and the eutectic carbides are oriented in one direction.

The difference of the surface characteristics adversely affects the finishing cutting processing with respect to the inner circumferential surface and the outer circumferential surface of the cylindrical portion R1, such as cutting load applied to a bite. Thus, it is difficult to process the entire cylindrical surface of a bearing in uniform with high-accuracy. Therefore, even in the case of forging stainless steel as a material, there is desired, by providing the entire cut target surface with the uniform surface characteristics, a blank for a ring member of a bearing enabling highly accurate cutting processing. Besides, in removing processing such as cutting processing or grinding, fallen crystal grains deteriorate processing accuracy. Accordingly, there is desired a manufacturing method for a blank for a ring member of a bearing having a reduced crystal grain size.

SUMMARY OF THE INVENTION

The present invention has been made in view of the above circumstances, and it is an object of the present invention to provide a blank for a ring member of a bearing in which cut target surface after stainless steel is forged has uniform surface characteristics, and highly accurate cutting processing is enabled, a manufacturing method for the same, a manufacturing method for a ring member of a bearing, and a bearing.

In order to attain the object described above, according to the present invention, there are employed the following measures.

The blank for a ring member of a bearing according to the present invention is a blank which is processed to the ring member of the bearing, including: a cylindrical portion formed by forging a stainless-steel material, and having an inner circumferential surface and an outer circumferential surface entirely being fluidized bed portions in which eutectic carbides are oriented in one direction; and a clamp portion provided to one end portion side of the cylindrical portion.

According to the blank for a ring member of a bearing, the entire surface of the cylindrical portion is a surface of the fluidized bed portion in which the eutectic carbides are oriented in one direction. Thus, when cutting processing is performed with respect to the surface, the processing can be performed with a uniform cutting force. Further, because the clamp portion is provided, even though the cylindrical portion formed to be a ring member is thinned, deformation due to the chuck can be prevented.

In the invention as described above, it is preferable that a pair of the cylindrical portions be coaxially provided, and the clamp portion be disposed in a midway between both the cylindrical portions. Accordingly, the clamp portion can be shared with the result that material can be saved.

Further, the pair of cylindrical portions may be any one combination of blanks for inner races, blanks for outer races, and the blank for an inner race and the blank for an outer race.

Further, the present invention provides a blank for a ring member of a bearing including: an outer-race cylindrical portion; a clamp portion connected to the outer-race cylindrical portion; and an inner-race cylindrical portion opposing the outer-race cylindrical portion through an intermediation of the clamp portion, and coaxially connected to the outer-race cylindrical portion.

According to the blank for a ring member of a bearing, the clamp portion is chucked as a gripped portion, so outer circumferences and inner circumferences of the outer-race cylindrical portion and the inner-race cylindrical portion can be processed. Even in the case where the cylindrical portion is thinned, the gripping force of the chuck can be readily adjusted, because the clamp portion is chucked as the gripped portion, and drill processing being a higher-load processing is not performed. Accordingly, processing can be highly-accurately performed without deforming the cylindrical portion. Further, since the outer-race cylindrical portion, the clamp portion, and the inner-race cylindrical portion are coupled, the clamp portion can be shared with the result that material can be saved.

In the invention as described above, it is preferable that an outer diameter of the clamp portion be equal to or larger than an outer diameter of the outer-race cylindrical portion.

Further, in the invention as described above, each of the outer-race cylindrical portion and the inner-race cylindrical portion may contain eutectic carbides therein, and the eutectic carbides may be oriented in parallel with a center axis thereof.

Since the eutectic carbides are oriented over the entire surfaces of the inner circumferential surface and the outer circumferential surface of the cylindrical portion, the surface of the blank to which the cutting processing or grinding processing is applied becomes uniform. Thus, the processing load is stabilized thereby highly accurately realizing processing.

Further, in the invention as described above, the clamp portion is preferably solid.

As structured above, in the cutting processing or the grinding processing of the blank for a ring member of a bearing, the clamp portion is chucked as the gripped portion with the strong gripping force to be fixed, so even though the cylindrical portion is thinned, deformation due to the chuck can be prevented. Further, opening of the chuck due to a centrifugal force generating when processing velocity is increased is reduced, so high accuracy and high productivity can be realized.

Further, in the present invention, it is preferable that the blank for a ring member of a bearing be made of a martensitic stainless steel containing 0.6 to 1.2% of C and 11 to 18% of Cr in weight ratio.

Herein, it is desirable that the martensitic stainless steel contain, as components other than C and Cr, 1% or less of Si, 1% or less of Mn, 0.04% or less of P, 0.03% or less of S, 0.3% or less of Mo, 0.15% or less of V, 15 ppm or less of Ti, 35 ppm or less of O, and the balance of Fe and an element inevitably contained, in weight ratio.

As a result, fine eutectic carbides and fine crystal grains can be readily obtained. Accordingly, accuracy deterioration due to the irregularly generating fallen eutectic carbides and crystal grains can be prevented from occurring. Thus, the accuracy of the cutting processing and the grinding processing can be increased.

Further, the present invention provides a manufacturing method for a blank for a ring member of a bearing, including: a cutting step of cutting a circular rod member into a columnar member having a predetermined length; a first forming step of forging the columnar member cut in the cutting step, to form the columnar member into a cup shape having an inner-race cylindrical portion and a clamp portion being a bottom portion connected to the inner-race cylindrical portion; and a second forming step of forming an outer-race cylindrical portion at a position where the outer-race cylindrical portion opposes the inner-race cylindrical portion with an intermediation of the clamp portion such that the outer-race cylindrical portion is coaxially connected to the inner-race cylindrical portion.

According to the manufacturing method for a blank for a ring member of a bearing, the inner-race cylindrical portion and the outer-race cylindrical portion are forged from the columnar member. Thus, formation can be performed without wasting the material.

Herein, the circular rod member is desirably a coil type of several meters to several tens of meters because of being supplied to the cutting step without interruption. The circular rod member is automatically supplied to the cutting step, and the cut columnar member is continuously processed in the first forming step and then the second forming step. As processing equipment thereof, a progressive mechanism is provided in the cutting step, the first forming step, and the second forming step. Thus, a high-speed processing can be achieved such that several products are processed every minute.

In the present invention, the circular rod member may be made of a martensitic stainless steel containing 0.6 to 1.2% of C and 11 to 18% of Cr in weight ratio.

Herein, it is desirable that the martensitic stainless steel contain, as components other than C and Cr, 1% or less of Si, 1% or less of Mn, 0.04% or less of P, 0.03% or less of S, 0.3% or less of Mo, 0.15% or less of V, 15 ppm or less of Ti, 35 ppm or less of O, and the balance of Fe and an element inevitably contained, in weight ratio.

As a result, fine eutectic carbides and fine crystal grains can be readily obtained, and the eutectic carbides are oriented in parallel with an annular-ring center axis on the surface of the cylindrical portion. Accordingly, in the next step of the cutting processing or the grinding processing, the accuracy deterioration due to the irregularly generating fallen eutectic carbides and crystal grains can be prevented from occurring. Thus, the processing accuracy can be increased.

Further, the manufacturing method for a ring member of a bearing according to the present invention includes: processing a blank including: a cylindrical portion formed by forging a stainless-steel material, and having an inner circumferential surface and an outer circumferential surface entirely being fluidized bed portions in which eutectic carbides are oriented in one direction; and a clamp portion provided to one end portion side of the cylindrical portion; and manufacturing a ring member being an inner race or an outer race of a bearing.

According to the manufacturing method for a ring member of a bearing, the entire surface of the cylindrical portion being the fluidized bed in which the eutectic carbides are oriented in one direction is cutting-processed or grinding-processed. Thus, a ring member with high accuracy can be manufactured. Further, since the clamp portion is provided, even though the cylindrical portion formed to be a ring member is thinned, deformation due to the chuck can be prevented. Thus, a ring member of higher accuracy can be manufactured.

In the present invention as described above, it is preferable that the ring member of a bearing be manufactured from the cylindrical portion having a range apart from a connecting position of the cylindrical portion and the clamp portion by a distance A or more, which is represented by the following equation, toward a front end portion of the cylindrical portion, $$A=(t\times 0.8)\times (R/r)$$

where t represents a thickness diameter of the cylindrical portion in a radius direction thereof, R represents an outer diameter of the cylindrical portion, and r represents an inner diameter of the cylindrical portion.

In plastic flow of the crystal grains of the eutectic carbides generating in processing the inner diameter by forging, distortion occurs by an amount of 80% of the thickness diameter t. Thus, as the thickness diameter t is larger, more distortion is liable to occur in cutting the ring member. Further, density thereof increases inversely proportional to a ratio of the outer diameter R with respect to the inner diameter r. Thus, as the ratio R/r is smaller, the distance A reduces more. Accordingly, the material can be used effectively.

Accordingly, a ring member can be structured only by using the cylindrical portion having the fluidized bed in which the crystal grains of the eutectic carbides are oriented in one direction. As a result, a ring member can be manufactured in which hardness is uniformly increased over the entire surfaces, and shape accuracy including surface roughness of a race surface is increased. Thus, a ring member can be manufactured in which abrasion resistance property with respect to a sliding ball is increased, and sliding resistance of the bearing can be reduced.

Further, the bearing according to the present invention includes: a ring member for an inner race and a ring member for an outer race manufactured by the manufacturing method for a ring member of a bearing as described above; and at least one spherical body sandwiched between the ring members.

According to the bearing, each of an inner race and an outer race includes the ring member with high accuracy which is obtained such that the cylindrical portion of the blank being the fluidized bed in which the eutectic carbides are oriented in one direction over the entire surfaces of the inner circumferential surface and the outer circumferential surface is cutting-processed or grinding-processed. Thus, rotation can be secured highly accurately, and generation of malfunctions can be reduced when being used.

According to the present invention described above, in the blank for a ring member of a bearing formed by forging a stainless-steel material, the entire cut target surface to which the finishing cutting processing or grinding processing is applied is the fluidized bed. Thus, by cutting or grinding the fluidized bed, a ring member of a bearing with high accuracy can be obtained.

Further, since the blank includes the clamp portion, even though the cylindrical portion is thinned, deformation due to the chuck can be prevented.

Therefore, a ring member of a bearing made of stainless steel can be readily downsized and have high accuracy. Thus, a bearing made of stainless steel including the ring member as a structural component can also be downsized and have high accuracy.

Further, according to a bearing of the present invention, the race surfaces of the inner race and the outer race obtained by processing the surfaces of the fluidized bed has uniform high hardness over the entire surfaces. Thus, the abrasion resistance property with respect to a spherical body is increased, and sliding resistance (frictional force) of the bearing reduces, which are remarkably effective to increase durability and reliability.

BRIEF DESCRIPTION OF THE DRAWINGS

FIG. 14 are diagrams each showing a conventional example in which.

DETAILED DESCRIPTION OF THE PREFERRED EMBODIMENTS

Hereinafter, embodiments of a blank 10 for a ring member of a bearing according to the present invention will be described with reference to the drawings.

First Embodiment

Figure 1:
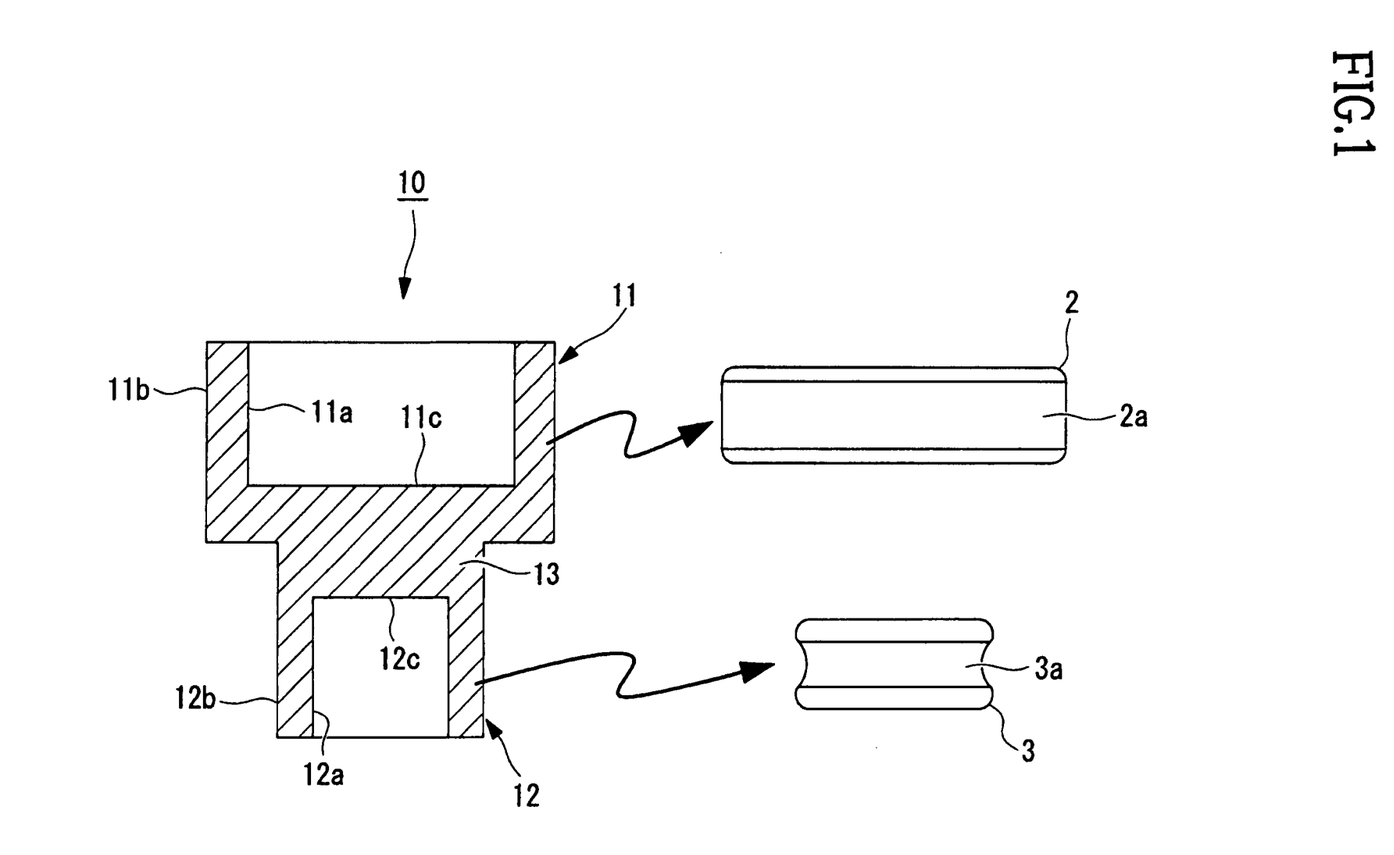
FIG. 1 is a longitudinal cross-sectional view showing a blank for a ring member of a bearing according to a first embodiment of the present invention.

The blank 10 shown in FIG. 1 is, for example, used to manufacture an outer race 2 and an inner race 3 structuring a pivot bearing 1 of a hard disk drive. The outer race 2 and the inner race 3 structures, for example, as shown in FIG. 1, are assembled to form the bearing 1 by providing one or more balls (spherical bodies) 4 between race surfaces 2a and 3a of the both races 2 and 3.

The blank 10 shown in the figure is formed of a stainless-steel circular rod member (solid material) by forging using a die, and includes, as a pair of cylindrical portions coaxially provided, an outer-race cylindrical portion 11 being a blank for manufacturing the outer race 2 of the bearing 1, and an inner-race cylindrical portion 12 being a blank for manufacturing the inner race 3.

The outer-race cylindrical portion 11 is a cylindrical portion in which entire surfaces of an inner circumferential surface 11a and an outer circumferential surface 11b are fluidized beds.

The inner-race cylindrical portion 12 is a cylindrical portion in which entire surfaces of an inner circumferential surface 12a and an outer circumferential surface 12b are similar fluidized beds.

Each of the fluidized beds described above is a portion in which, when metal material is pressurized by a die or the like and subjected to plastic flow to be formed in forging processing, eutectic carbides are oriented in one direction, and will be referred to as "fluidized bed portion" in the following description. That is, the fluidized bed portion is a surface formed while being in contact with the die in the forging processing, and increased in hardness while the eutectic carbides are oriented in one direction. Thus, each of the outer-race cylindrical portion 11 and the inner-race cylindrical portion 12 formed by the solid material approximately entirely includes a fluidized bed portion.

Figure 2:
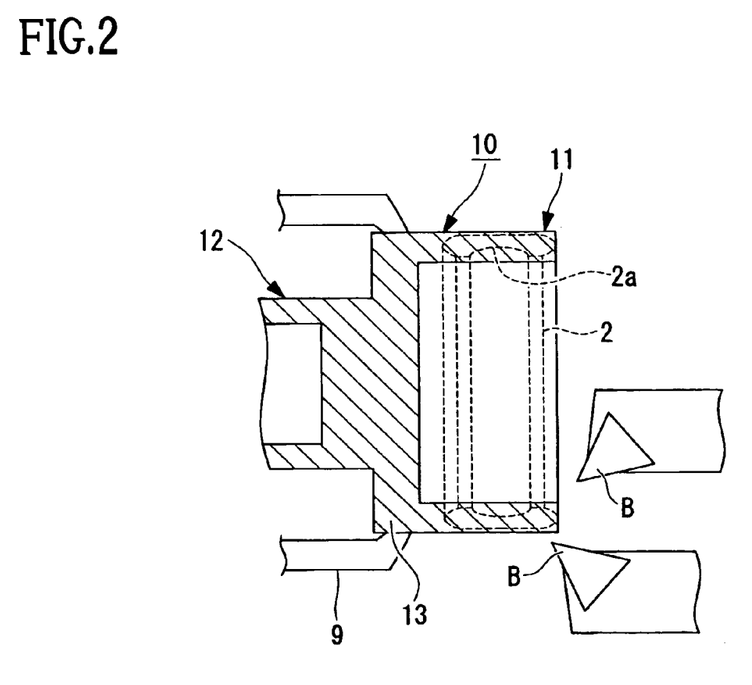
FIG. 2 is a main-portion cross-sectional view showing a state of cutting the blank shown in FIG. 1.

The outer-race cylindrical portion 11 and the inner-race cylindrical portion 12 described above are each provided with a base surface 11c and a base surface 12c continuously and integrally closing an end portion side connecting the both cylindrical portions 11 and 12. A portion (region in an axial direction) in which the base surfaces 11c and 12c are present is solid. Thus, as shown in FIG. 2 for example, this solid portion can be used as a clamp portion 13 for a chuck with which the blank 10 is fixedly supported by a chuck 9 in cutting processing. As shown in FIG. 2, the chuck 9 grips only the clamp portion 13 and does not grip the cylindrical portions 11 and 12. As illustrated, the cylindrical portions 11 and 12 are axially spaced from one another in non-overlapping relation with their base surfaces 11c and 12c opposed to and axially spaced from each other by the clamp portion 13.

Accordingly, the blank 10 shown in FIG. 1 is of a so-called "family mold", and has a structure in which the outer-race cylindrical portion 11, the clamp portion 13, and the inner-race cylindrical portion 12 are integrally connected and coaxially disposed. With one blank 10, two components (outer race 2 and inner race 3) can be manufactured. Owing to the structure, in the case where the clamp portion 13 is shared in particular, materials can be saved and scraps can be reduced.

In manufacturing the outer race 2 with the blank 10, as shown in FIG. 2 for example, after the clamp portion (preferably, portion forming the base surface 11c of the outer-race cylindrical portion 11) 13 is gripped by the chuck 9 of a machine tool, the machine tool is driven to cut the outer-race cylindrical portion 11 by bites B into the outer race 2 (shown by dashed lines of FIG. 2) having a desired shape. In this case, all cut target surfaces of the outer-race cylindrical portion 11 are fluidized bed portions. Thus, surface characteristics such as hardness is substantially uniform over the entire surfaces. Accordingly, cutting load applied to the bites B is substantially uniform. Therefore, cutting processing can be highly-accurately and readily performed over the entire surfaces.

Further, even in a case where the outer race 2 is thinned due to the bearing 1 downsized, since the solid clamp portion 13 is provided as a chuck in the cutting processing, processing accuracy does not decrease owing to the deformation.

Meanwhile, when the inner race 3 is manufactured from the blank 10, the clamp portion 13 is similarly chucked, and the bites B cut the inner-race cylindrical portion 12 in a desired shape. Also in this case, all cut target surfaces of the inner-race cylindrical portion 12 are fluidized bed portions. Thus, surface characteristics such as hardness is substantially uniform over the entire surfaces. Accordingly, cutting processing can be performed highly-accurately and readily over the entire surfaces.

Further, even in a case where the inner race 3 is thinned while downsizing the bearing 1, since the solid clamp portion 13 is provided as a chuck in the cutting processing, processing accuracy does not decrease owing to the deformation. Further, it is preferable to use a portion forming the base surface 12c of the inner-race cylindrical portion 12 as the clamp portion 13 to be chucked.

In the bearing 1 manufactured by the manufacturing method for the blank 10 and the ring members (outer race 2 and inner race 3) as described above, the race surface 2a of the outer race 2 and the race surface 3a of the inner race 3 are the fluidized bed portions having large hardness uniform over the entire surfaces. Accordingly, the race surfaces 2a and 3a on which the balls 4 slide are increased in abrasion resistance property, and can reduce sliding resistance of the bearing 1.

Figure 3:
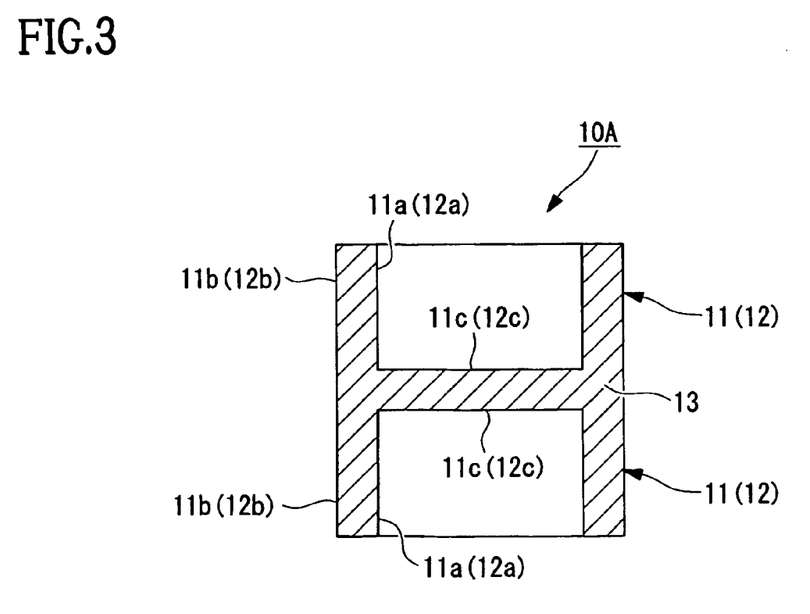
FIG. 3 is a longitudinal cross-sectional view showing a modification example of the blank of FIG. 1.

FIG. 3 shows a modification example of the blank 10 of the family mold as described above. A blank 10A shown in the figure is a structural example in which, in both sides of the clamp portion 13, a pair of outer-race cylindrical portions 11 (alternatively, inner-race cylindrical portions 12) having the same diameter are coaxially provided.

The blank 10A is also formed of a stainless-steel circular rod member by forging. Accordingly, the inner surfaces 11a and 12a and the outer surfaces 11b and 12b of the cylindrical portions 11 and 12 are the fluidized bed portions, respectively, in which the eutectic carbides are fragmented over the entire surfaces. Thus, all cut target surfaces have surface characteristics such as hardness substantially uniform over the entire surfaces. Accordingly, cutting processing can be highly-accurately and readily performed over the entire surfaces. Further, even in a case where the outer race 2 and the inner race 3 are thinned due to the bearing 1 downsized, since the clamp portion 13 is provided, processing accuracy does not decrease owing to the deformation due to the chuck in the cutting processing.

In this case, with the cylindrical portion 11 or 12, one ring member for the outer race 2 or the inner race 3 may be manufactured. Alternatively, the cylindrical portion 11 or the cylindrical portion 12 may be increased more than as shown in FIG. 3 in an axial length thereof in at least one direction, to there by manufacture a plurality of ring members.

Figure 4:
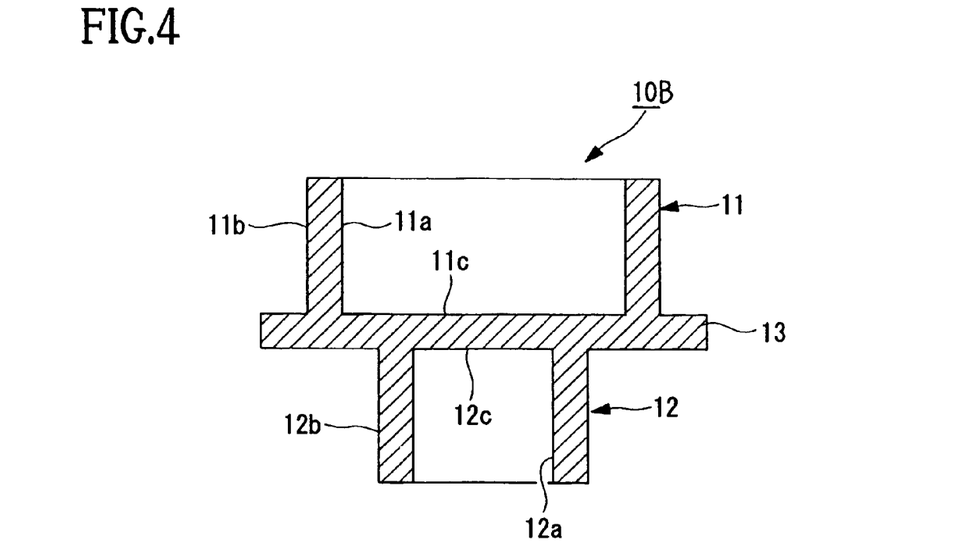
FIG. 4 is a longitudinal cross-sectional view showing another modification example of the blank of FIG. 1.

Further, with regard to the blank 10 of the family mold, a structure of a modification example is shown in FIG. 4 in which the clamp portion 13 is improved and the chuck in the cutting processing is facilitated. A blank 10B shown in the figure has a structural example in which the outer-race cylindrical portion 11 and the inner-race cylindrical portion 12 are coaxially provided in a pair in the both sides of the clamp portion 13.

Subsequently, the manufacturing method for the blank 10 for a ring member of a bearing as described above, and the manufacturing method for a ring member of a bearing using the blank 10 will be described with reference to FIGS. 5 to 8.

Figure 5:
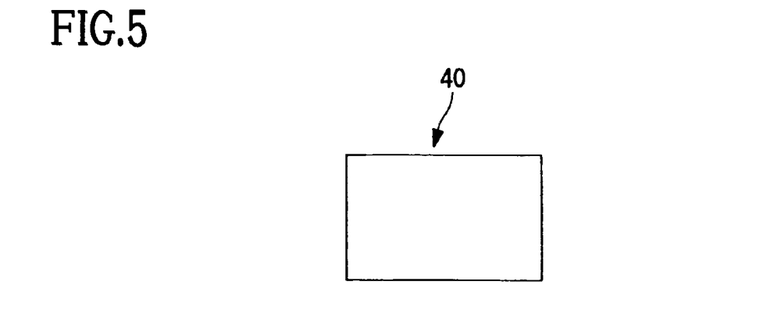
FIG. 5 is a side-surface diagram showing a cutting step of a manufacturing method for the blank of FIG. 1.
Figure 6:
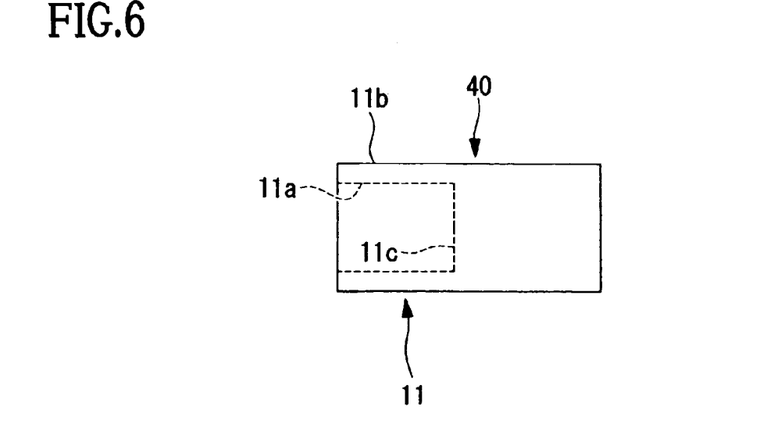
FIG. 6 is a side-surface diagram showing a first forging step of the manufacturing method for the blank of FIG. 1.

FIG. 5 is a side-surface diagram showing a state in which the circular rod member is cut to be a columnar member 40 having a predetermined length in a cutting step. Each of two end surfaces thereof has a substantially-circular shape. FIG. 6 is a side-surface diagram showing a state in which the columnar member 40 is forged to thereby form the inner-race cylindrical portion 11 in a first forging/forming step, and the inner circumferential surface 11a, the outer circumferential surface 11b, and the base surface 11c thereof are formed. As shown in FIG. 6, the columnar member 40 is formed to have a cup shape in which the base surface 41c is thick in its depth.

Figure 7:
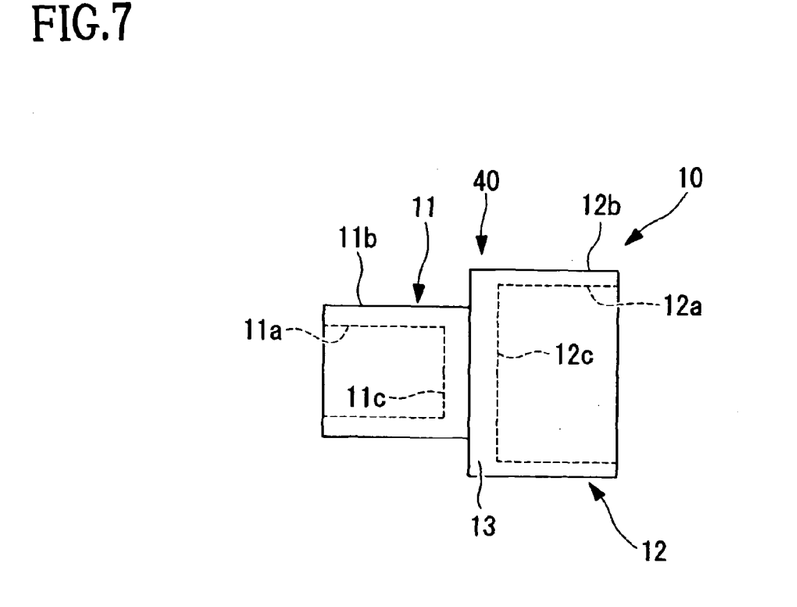
FIG. 7 is a side-surface diagram showing a second forging step of the manufacturing method for the blank of FIG. 1.

FIG. 7 is a side-surface diagram showing a state in which the columnar member 40 is further forged to thereby form the outer-race cylindrical portion 12 at a position where the outer-race cylindrical portion 12 opposes the inner-race cylindrical portion 11 in a second forging/forming step, and the inner circumferential surface 12a, the outer circumferential surface 12b, and the base surface 12c thereof are formed. As shown in FIG. 7, the inner circumferential surface 11a and the outer circumferential surface 11b of the inner-race cylindrical portion 11 and the inner circumferential surface 12a and the outer circumferential surface 12b of the outer-race cylindrical portion 12 are coaxially connected.

Herein, the outer-race cylindrical portion 12 experiences one or more forging steps so as to be larger than the outer diameter of the columnar member 40. Thus, there can be manufactured the blank 10 for ring members of bearings having different outer diameters as in the case of the inner-race cylindrical portion 11 and the outer-race cylindrical portion 12.

In this case, the circular rod member is continuously supplied in the cutting step without interruption, and thus is desirably a coil type of several meters to several tens of meters. The circular rod member is automatically supplied in the cutting step, and the cut columnar member 40 is continuously processed in the first forging/forming step and then the second forging/forming step. Processing equipment thereof is provided with a progressive mechanism in the cutting step, the first forging/forming step, and the second forging/forming step. Thus, a high-speed processing can be achieved such that several products are processed every minute.

Next, there will be described the manufacturing method for a ring member of a bearing using the blank 10 for a ring member of a bearing manufactured in the above-mentioned manufacturing steps.

Figure 8:
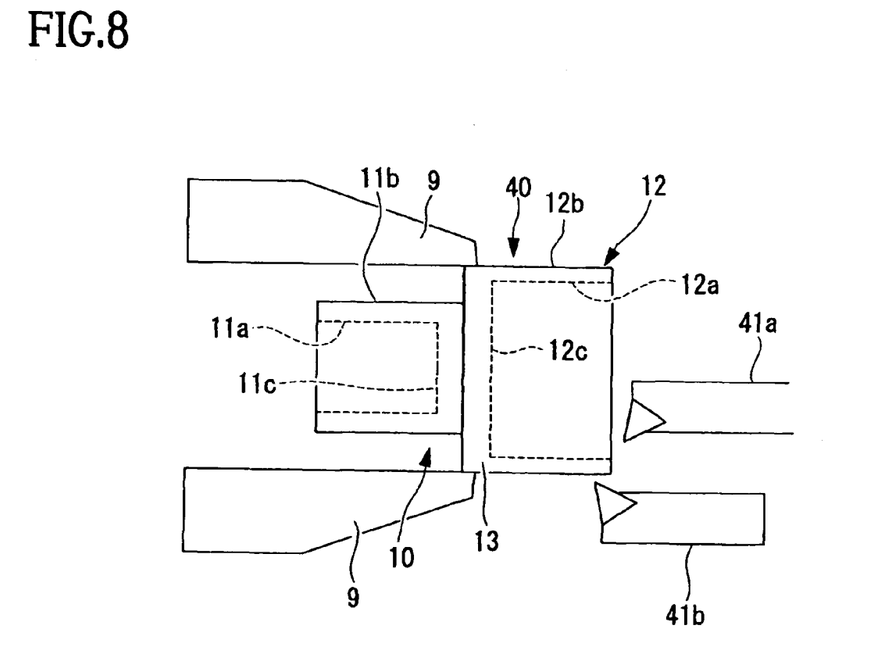
FIG. 8 is an outer-appearance diagram showing a cutting step of a manufacturing method for a ring member using the blank of FIG. 1.

FIG. 8 is an outer-appearance diagram showing a state where the clamp portion 13 of the blank 10 for a ring member is gripped by the chuck 9 of a lathe. Even when the blank 10 is fixed by a predetermined gripping force, the solid clamp member 13 hinders deformation of the cylindrical member. Further, there is shown herein a state where the inner circumferential surface 12a of the cylindrical portion 12 is processed by an inner-surface turning cutter 41a, and the outer circumferential surface 12b thereof is processed by an outer-surface turning cutter 41b. Similarly, when the processing of the outer-race cylindrical portion 12 is finished, the blank 10 is reversed, and the clamp portion 13 is gripped by the chuck 9 of the lathe. Thus, the inner-race cylindrical portion 11 can be processed.

The inner circumferential surface 12a of the outer-race cylindrical portion 12 is drill-processed by forging. Thus, a drilling processing of a large processing load is omitted. There is only need to fix the blank 10 with the gripping force of the chuck 9 larger than the processing load of the inner-surface turning cutter 41a and that of the outer-surface turning cutter 41b. The processing load is small and fluctuation thereof is small, so processing can be highly-accurately performed. Further, the base surface 12c of the outer-race cylindrical portion 12 and the base surface 11c of the inner-race cylindrical portion 11 is shared by the clamp portion 13 coupling the both cylindrical portions 11 and 12, so the material can be saved.

Further, in a case where a martensitic stainless steel is used to form the blank 10 shown in the figure, in the cylindrical portions 11 and 12 formed in the forging processing such that metal material is pressurized by a die and subjected to plastic flow, plastic flow of the eutectic carbides and crystal grains occurs. The plastic flow uniformly is oriented in the center axis of the cylindrical portions 11 and 12 in parallel, and fluidized beds emerge in front layers of the inner circumferential surface 11a and the outer circumferential surface 11b of the inner-race cylindrical portion 11 and the inner circumferential surface 12a and the outer circumferential surface 12b of the outer-race cylindrical portion 12.

As described above, with respect to the blank 10 for a ring member of a bearing according to this embodiment, in the case of manufacturing the bearing 1 made of stainless steel which is to be used in a precision apparatus such as a hard disk drive, in the blank 10 formed by forging the stainless-steel material, the entire cut target surfaces (inner circumferential surface 11a and outer circumferential surface 11b) of the cylindrical portion to which the finishing cutting processing is applied are fluidized bed portions in which the eutectic carbides are oriented in one direction.

Accordingly, in the race surfaces 2a and 3a of the outer race 2 and the inner race 3 being the fluidized bed portions, the eutectic carbides and the crystal grains are oriented in one direction, and hardness uniformly increases over the entire surfaces. Thus, shape accuracy including surface roughness of the race surfaces 2a and the race surface 3a increases. Thus, abrasion resistance property with respect to the sliding balls 4 increases, and the sliding resistance (frictional force) of the bearing 1 reduces. As a result, the outer race 2, the inner race 3, and the bearing 1 including those as structural components are increased in durability and reliability.

Further, the entire cut target surfaces are the fluidized bed portions having uniform surface properties, so the cutting processing can be performed highly accurately. Further, by providing the clamp portion 13, even though the outer race 2 and the inner race 3 are thinned, deformation due to the chuck can be prevented. Therefore, a ring member of a bearing made of stainless steel can be readily downsized and have high accuracy. Thus, a stainless-steel bearing including the ring member as a structural component can be similarly downsized and have high accuracy.

Figure 9:
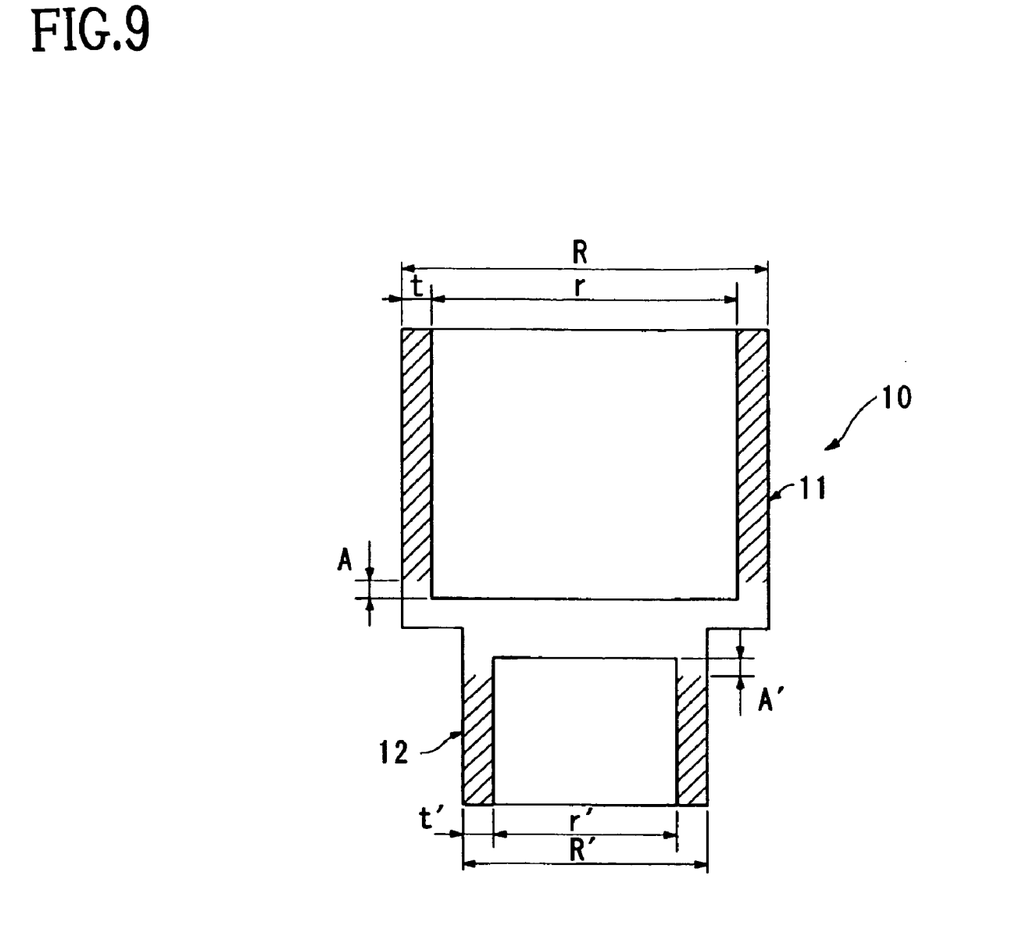
FIG. 9 is a side-surface diagram showing an effectively area in cutting the ring member for the blank of FIG. 1.

In this case, it is preferable that, in each of the cylindrical portions 11 and 12, a range to be used as the material of the ring member be a portion apart from each of the base surfaces 11c and 12c of the cylindrical portions 11 and 12 by a distance A or more, which is represented by the following equation, toward a front end portion of each of the cylindrical portions 11 and 12. FIG. 9 is a side-surface diagram showing an effective area in cutting the ring member for the blank of FIG. 1.

$$A = (t \times 0.8) \times (R/r)$$

where t represents a thickness diameter of each of the cylindrical portions 11 and 12 in a radius direction thereof, R represents an outer diameter of each of the cylindrical portions 11 and 12, and r represents an inner diameter of each of the cylindrical portions 11 and 12.

In the plastic flow of the crystal grains of the eutectic carbides generated in processing the inner diameter by forging, distortion occurs by an amount of 80% of the thickness diameter t. Thus, as the thickness diameter t is larger, more distortion is likely to occur in cutting the ring member. Further, density thereof increases inversely proportional to a ratio of the outer diameter R with respect to the inner diameter r. Thus, as the ratio R/r is smaller, the distance A reduces more. Accordingly, the material can be used effectively.

Second Embodiment

Subsequently, with reference to FIG. 10, a blank 20 having one cylindrical portion will be described.

The blank 20 shown in the figure is a molded forging to be processed as the outer race 2 or the inner race 3 of a bearing. By forging a stainless-steel material using a die, the blank 20 is formed. The blank 20 includes a cylindrical portion 21 including an inner circumferential surface 21a and an outer circumferential surface 21b being fluidized bed portions entirely, and a clamp portions 22 provided at one end portion side of the cylindrical portion 21.

The fluidized bed portions of the cylindrical portion 21 are portions in which, in the forging processing, when the metal material is pressurized by a die or the like to plastic flow and to be formed, the eutectic carbides in the surface are oriented in one direction, and are surfaces in which, in the forging processing, the portions are in contact with the die, the eutectic carbides in the surface are oriented in on direction, and hardness increases. Thus, the cylindrical portion 21 formed from the solid material has both the inner circumferential surface 21a and the outer circumferential surface 21b entirely being the fluidized bed portions.

The clamp portion 22 is a solid portion in which a base surface 21c of the cylindrical portion 21 exists, and protrudes toward the outside in a collar manner from the outer circumferential surface of the cylindrical portion 21.

The blank 20 having such a structure is formed by forging the stainless-steel material. Thus, the inner circumferential surface 21a and the outer circumferential surface 21b of the cylindrical portion 21 are entirely the fluidized bed portions. Thus, surface characteristics such as hardness is substantially uniform over the entire cut target surfaces. Accordingly, cutting processing can be highly-accurately and readily performed over the entire surfaces. Further, even in a case where the outer race 2 and the inner race 3 are thinned while downsizing the bearing, since the clamp portion 22 is provided, processing accuracy does not decrease owing to the deformation due to the chuck.

Figure 10:
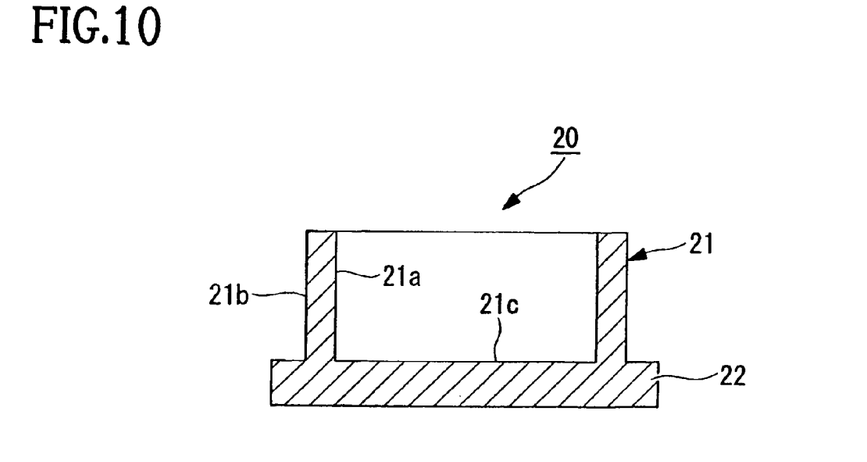
FIG. 10 is a longitudinal cross-sectional view showing a blank for a ring member of a bearing according to a second embodiment of the present invention.
Figure 11:
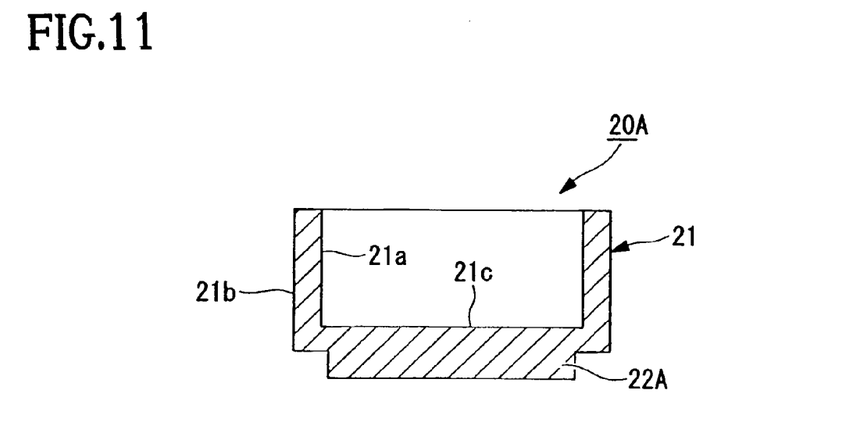
FIG. 11 is a longitudinal cross-sectional view showing a modification example of the blank of FIG. 10.

A blank 20A shown in FIG. 11 shows a first modification example of the blank 20 shown in FIG. 10. Herein, similar reference symbols are attached to portions similar to the blank 20 shown in FIG. 10, and detailed description thereof will be omitted.

A clamp portion 22A of the blank 20A includes the base surface 21c whose lower end portion side has partially a smaller diameter than the outer diameter of the cylindrical portion 21.

Figure 12:
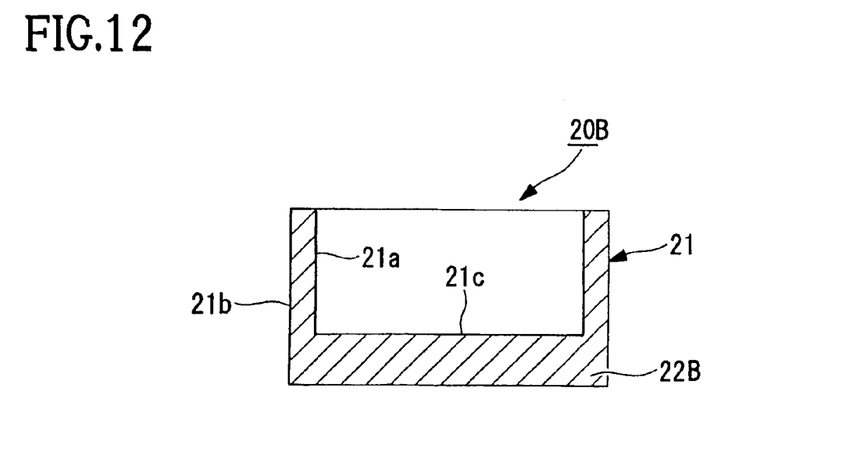
FIG. 12 is a longitudinal cross-sectional view showing another modification example of the blank of FIG. 10.

A blank 20B shown in FIG. 12 shows a second modification example of the blank 20 shown in FIG. 10. Herein, similar reference symbols are attached to portions similar to the blank 20 shown in FIG. 10, and detailed description thereof will be omitted.

A clamp portion 22B of the blank 20B includes the base surface 21c whose lower end portion side has the same diameter as the outer diameter of the cylindrical portion 21, and the outer circumferential surface of the cylindrical portion 21 has a shape without a recess or a protrusion.

As described above, in the blank 20 according to this embodiment, similarly to the blank 10 of the first embodiment, the entire cut target surfaces (inner circumferential surface 21a and outer circumferential surface 21b) of the cylindrical portion to which the finishing cutting processing is applied are the fluidized bed portions in which the eutectic carbides are oriented in one direction.

Accordingly, in the race surfaces 2a and 3a of the outer race 2 and the inner race 3 being the fluidized bed portions, the eutectic carbides and the crystal grains are oriented in one direction, and hardness uniformly increases over the entire surfaces. Thus, shape accuracy including surface roughness of the race surface 2a and the race surface 3a increases. Thus, abrasion resistance property with respect to the sliding balls 4 increases, and the sliding resistance (frictional force) of the bearing 1 reduces. As a result, the outer race 2, the inner race 3, and the bearing 1 including those as structural components are increased in durability and reliability.

Further, the entire cut target surfaces are the fluidized bed portions having uniform surface properties, so the cutting processing can be performed highly accurately. Further, by providing the clamp portion 22, even though the outer race 2 and the inner race 3 are thinned, deformation due to the chuck can be prevented. Therefore, a ring member of a bearing made of stainless steel can be readily downsized and have high accuracy. Thus, a stainless-steel bearing including the ring member as a structural component can be similarly downsized and have high accuracy.

In the above description, the bearing 1 being a pivot bearing of a hard disk drive has been explained. However, it is needless to say that the bearing 1 can be applicable to, in addition to another bearing of a hard disk drive, a bearing used in a precision apparatus such as a television or a computer peripheral device, and a small stainless-steel bearing required to have a higher accuracy, in particular.

It should be noted that the present invention is not limited to the above-mentioned embodiments, and can be modified as required within a scope of the present invention without departing from the gist of the present invention.

What is claimed is:

1. A blank for a ring member of a bearing, which is processed to form the ring member of the bearing, comprising:
   a cylindrical portion that is to be formed into a ring member of a bearing and formed by forging a stainless-steel material, the cylindrical portion having a uniform thickness and having an inner circumferential surface and an outer circumferential surface in which eutectic carbides are oriented in one direction; and
   a clamp portion that closes one end portion side of the cylindrical portion and that is integral with the cylindrical portion, the clamp portion being configured and dimensioned to be gripped by a tool, without the tool gripping the cylindrical portion, during processing of the cylindrical portion into a ring member of a bearing.

2. A blank for a ring member of a bearing according to claim 1; wherein a pair of the cylindrical portions are coaxially provided; and the clamp portion is disposed midway between both of the cylindrical portions.

3. A blank for a ring member of a bearing according to claim 2; wherein each of the cylindrical portions contains eutectic carbides, the eutectic carbides being oriented in parallel with a center axis of each of the cylindrical portions.

4. A blank for a ring member of a bearing according to claim 1; wherein the clamp portion is solid.

5. A blank for a ring member of a bearing according to claim 1; wherein the blank is made of a martensitic stainless steel containing 0.6 to 1.2% of C and 11 to 18% of Cr in weight ratio.

6. A manufacturing method for a ring member of a bearing, comprising:

gripping the clamp portion but not the cylindrical portion of the blank for a ring member of a bearing according to claim 1 in a radius direction; and performing cutting processing or grinding processing of the blank to form an outer shape of the ring member of a bearing.

7. A blank for outer and inner ring members of a bearing, comprising:

an outer-race cylindrical portion that is to be formed into an outer ring member of a bearing;

an inner-race cylindrical portion that is to be formed into an inner ring member of the bearing, the inner-race cylindrical portion being coaxial with and axially spaced in non-overlapping relation from the outer-race cylindrical portion; and a clamp portion that coaxially interconnects and closes opposed end portions of the outer-race and inner-race cylindrical portions, the clamp portion being configured and dimensioned to be gripped by a tool without the tool gripping the outer-race and inner-race cylindrical portions during processing of the inner-race and outer-race cylindrical portions into outer and inner ring members of a bearing.

8. A blank for outer and inner ring members of a bearing according to claim 7; wherein an outer diameter of the clamp portion is equal to or larger than an outer diameter of the outer-race cylindrical portion.

9. A blank for outer and inner ring members of a bearing according to claim 7; wherein the clamp portion is solid.

10. A blank for outer and inner ring members of a bearing according to claim 7; wherein each of the cylindrical portions contains eutectic carbides, the eutectic carbides being oriented in parallel with a center axis of each of the cylindrical portions.

11. A blank for outer and inner ring members of a bearing according to claim 7; wherein the blank is made of a martensitic stainless steel containing 0.6 to 1.2% of C and 11 to 18% of Cr in weight ratio.

12. A blank for outer and inner ring members of a bearing according to claim 7; wherein the inner-race cylindrical portion has an outer diameter that is smaller than an inner diameter of the outer-race cylindrical portion.

13. A manufacturing method for a blank for a ring member of a bearing, comprising:

a cutting step of cutting a circular rod member into a columnar member having a predetermined length;

a first forming step of forging the columnar member into a cup shape having an inner-race cylindrical portion and a clamp portion being a bottom portion connected to the inner-race cylindrical portion; and a second forming step, performed after completion of the first forming step, of forming an outer-race cylindrical portion at a position where the outer-race cylindrical portion opposes the inner-race cylindrical portion with an intermediation of the clamp portion such that the outer-race cylindrical portion is coaxially connected to the inner-race cylindrical portion.

14. A manufacturing method for a blank for a ring member of a bearing according to claim 13; wherein the circular rod member is made of a martensitic stainless steel containing 0.6 to 1.2% of C and 11 to 18% of Cr in weight ratio.

15. A manufacturing method for a ring member of a bearing, comprising:

preparing a blank having a cylindrical portion formed by forging a stainless-steel material, the cylindrical portion having an inner circumferential surface and an outer circumferential surface in which eutectic carbides are oriented in one direction, and a clamp portion integral with and closing one end portion side of the cylindrical portion; and processing the blank while gripping the clamp portion but not the cylindrical portion by a tool to form a ring member that is an inner race or an outer race of a bearing.

16. A blank that can be formed into two bearing ring members, the blank comprising: two cylindrical portions that are to be formed into ring members of a bearing, each cylindrical portion having a cylindrical wall portion having inner and outer circumferential surfaces and a bottom surface that closes one end of the cylindrical portion, the two cylindrical portions being coaxial with one another and axially spaced from one another in non-overlapping relation with their bottom surfaces opposed to and axially spaced from each other; and a clamp portion interconnecting the closed end sides of the two cylindrical portions and configured and dimensioned to be gripped by a tool, without the tool gripping the two cylindrical portions, during machine processing of the two cylindrical portions of the blank into ring members of a bearing.

17. A blank according to claim 16; wherein the entire axial extent of the inner and outer circumferential surfaces of the two cylindrical portions contain eutectic carbides that are oriented in one direction.

18. A blank according to claim 16; wherein the inner and outer diameters of one cylindrical portion are larger than those of the other cylindrical portion.

19. A blank according to claim 16; wherein the inner and outer diameters of one cylindrical portion are the same as those of the other cylindrical portion.

20. A blank according to claim 16; wherein the blank is made of a martensitic stainless steel containing 0.6 to 1.2% of C and 11 to 18% of Cr in weight ratio.

21. A blank according to claim 16; wherein the clamp portion is in the form of a solid cylinder having a diameter the same as or larger than the outer diameter of one of the two cylindrical portions.

* * * * *